(12) United States Patent
Sakamoto et al.

(10) Patent No.: US 11,104,053 B2
(45) Date of Patent: Aug. 31, 2021

(54) EXTRUDER

(71) Applicant: SUMITOMO RUBBER INDUSTRIES, LTD., Kobe (JP)

(72) Inventors: Masayuki Sakamoto, Kobe (JP); Tomoo Tanaka, Kobe (JP); Takuma Konishi, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 15/296,712

(22) Filed: Oct. 18, 2016

(65) Prior Publication Data

US 2017/0106579 A1 Apr. 20, 2017

(30) Foreign Application Priority Data

Oct. 19, 2015 (JP) .............................. JP2015-205942

(51) Int. Cl.
*B29C 48/66* (2019.01)
*B29C 48/60* (2019.01)
(Continued)

(52) U.S. Cl.
CPC .......... *B29C 48/687* (2019.02); *B29C 48/268* (2019.02); *B29C 48/54* (2019.02);
(Continued)

(58) Field of Classification Search
CPC . B29C 47/0871; B29C 47/605; B29C 47/661; B29C 47/667; B29C 47/767;
(Continued)

(56) References Cited

U.S. PATENT DOCUMENTS 3,115,674 A * 12/1963 Schrenk ................. B29C 47/60
138/40
3,169,752 A * 2/1965 Laubarede ............. B29B 7/422
366/80
(Continued)

FOREIGN PATENT DOCUMENTS

EP 0102400 A1 * 3/1984 ......... B29C 47/0871
EP 490359 A1 * 6/1992 ............. B29C 47/64
(Continued)

OTHER PUBLICATIONS

Japanese Office Action dated Jul. 16, 2019, for counterpart Japanese Patent Application No. 2015-205942, with English translation.
(Continued)

*Primary Examiner* — Elizabeth Insler
(74) *Attorney, Agent, or Firm* — Birch, Stewart, Kolasch & Birch, LLP

(57) ABSTRACT

The extruder includes: a cylinder having a first end portion and a second end portion respectively formed at two ends of the cylinder in an axial direction, and an ejection port formed in the first end portion; a screw including a shaft that is configured to rotate within the cylinder, and a screw blade that is provided on an outer circumferential surface of the shaft; a supplier that is attached to the second end portion side of the cylinder and is configured to supply a kneading target to an inside of the cylinder; and a plurality of protruding members that protrude from an inner wall surface of the cylinder.

5 Claims, 1 Drawing Sheet

(51) Int. Cl.
  B29C 48/76 (2019.01)
  B29C 48/685 (2019.01)
  B29C 48/54 (2019.01)
  B29C 48/68 (2019.01)
  B29C 48/25 (2019.01)
  B29B 7/74 (2006.01)
  B29B 7/84 (2006.01)
  B29C 48/67 (2019.01)
  B29K 21/00 (2006.01)

(52) U.S. Cl.
  CPC .......... B29C 48/681 (2019.02); B29C 48/767 (2019.02); *B29B 7/7495* (2013.01); *B29B 7/847* (2013.01); *B29C 48/67* (2019.02); *B29K 2021/003* (2013.01)

(58) Field of Classification Search
  CPC ............ B29C 47/6031; B29C 47/6043; B29C 47/5056; B29C 47/5062; B29C 47/6081; B29C 47/6075; B29C 47/6093; B29C 48/687; B29C 48/268; D01D 1/09; B29B 7/847
  USPC ................. 366/75, 76.1, 79, 81, 90
  See application file for complete search history.

(56) References Cited

U.S. PATENT DOCUMENTS

| | | | | |
|---|---|---|---|---|
| 3,367,635 A * | 2/1968 | Gresch | ............... | B29C 47/0871 159/2.2 |
| 3,458,894 A * | 8/1969 | Wheeler | ................ | B01F 7/048 366/78 |
| 3,981,658 A * | 9/1976 | Briggs | .................... | B29C 47/38 366/80 |
| 4,155,690 A * | 5/1979 | Checkland | .......... | B29C 47/0004 264/170 |
| 4,178,104 A * | 12/1979 | Menges | ................ | B29C 47/38 366/80 |
| 4,199,263 A * | 4/1980 | Menges | ................ | B29C 47/38 366/307 |
| 4,304,054 A * | 12/1981 | Nauck | .................... | B29C 47/38 100/117 |
| 4,347,003 A * | 8/1982 | Anders | .................. | B29C 47/50 366/193 |
| 4,361,081 A * | 11/1982 | Howard | ................. | B29C 47/38 100/117 |
| 4,416,543 A * | 11/1983 | Brinkmann | ............... | B01F 7/14 366/288 |
| 4,538,917 A * | 9/1985 | Harms | .................... | B29C 47/38 366/324 |
| 4,573,799 A * | 3/1986 | Anders | ............... | B29C 47/0871 366/323 |
| 4,582,433 A * | 4/1986 | Mehta | ................. | B01F 7/00816 366/307 |
| 4,629,326 A * | 12/1986 | Huis | ..................... | B30B 11/248 366/307 |
| 4,696,575 A * | 9/1987 | Upmeier | ............... | B29C 47/362 366/80 |
| 4,960,328 A * | 10/1990 | Schumacher | ....... | B29C 47/1063 366/307 |
| 5,033,860 A * | 7/1991 | Nakamura | ............. | B29C 47/60 366/89 |
| 5,141,426 A | 8/1992 | Capelle | | |
| 5,190,771 A * | 3/1993 | Baumgarten | .......... | B29C 47/38 264/349 |
| 6,814,481 B2 * | 11/2004 | Colombo | .............. | B29C 48/834 366/80 |
| 7,419,295 B2 * | 9/2008 | Inoue | ...................... | B29C 48/04 366/75 |
| 2004/0257904 A1* | 12/2004 | Zhang | ..................... | B29C 45/47 366/81 |
| 2006/0003042 A1 | 1/2006 | Inoue et al. | | |
| 2007/0183254 A1* | 8/2007 | Schobert-Csongor | ...................... | B01F 7/00816 366/82 |

FOREIGN PATENT DOCUMENTS

| | | |
|---|---|---|
| JP | 50-161556 A | 12/1975 |
| JP | 51-86576 | 7/1976 |
| JP | 54-150472 A | 11/1979 |
| JP | 58-128832 A | 8/1983 |
| JP | 59-64340 A | 4/1984 |
| JP | 62-273821 A | 11/1987 |
| JP | 63-191612 A | 8/1988 |
| JP | 4-276423 A | 10/1992 |
| JP | 5-104609 A | 4/1993 |
| JP | 9-207199 A | 8/1997 |
| JP | 2006-1252 A | 1/2006 |
| JP | 2008-302660 A | 12/2008 |

OTHER PUBLICATIONS

Japanese Office Action, dated Mar. 24, 2020, for Japanese Application No. 2015-205942, along with an English translation.

* cited by examiner

US 11,104,053 B2

EXTRUDER

TECHNICAL FIELD

The present invention relates to an extruder.

BACKGROUND ART

Conventionally, various kinds of extruders for kneading a kneading target, such as a rubber composition or synthetic resin, have been proposed. For example, Patent Literature 1 discloses a so-called vent-type extruder. In a vent-type extruder, a certain area of a screw has a smaller pitch, and pressure is applied to a kneading target in this area so that the kneading target generates heat. Then, water is vaporized from the kneading target that is generating heat, and the gas vapor is sucked from a vent to the outside of a cylinder, using a vacuum pump.

CITATION LIST

Patent Literature

Patent Literature 1: JP 63-191612A

SUMMARY OF INVENTION

In conventional vent-type extruders, the pitch of the screw blade is partially reduced in order to apply heat to the kneading target. However, this configuration has a problem in that the amount of kneading target that can be ejected is reduced. The present invention is made in view of this problem, and aims to provide an extruder that can remove gas or the like from the kneading target in the same manner as a vent-type extruder, while increasing the amount of ejection.

An extruder according to one aspect of the present invention includes: a cylinder having a first end portion and a second end portion respectively formed at two ends of the cylinder in an axial direction, and an ejection port formed in the first end portion; a screw including a shaft configured to rotate within the cylinder, and a screw blade provided on an outer circumferential surface of the shaft; a supplier attached to the second end portion side of the cylinder and configured to supply a kneading target to an inside of the cylinder; and a plurality of protruding members protruding from an inner wall surface of the cylinder. An intermediate section of the screw in the axial direction is provided with at least one compressor that is configured to compress the kneading target while the kneading target is being transported, and to cause the kneading target to generate heat, and the cylinder is provided with a degassing hole that is located downstream of the compressor and is in communication with an outside of the cylinder.

In the above-described extruder, an intermediate section of the screw in the axial direction may be provided with at least one compressor. The degassing hole may be located downstream of each compressor. The compressor controls the amount of kneading target that passes therethrough. Therefore, it is possible to compress the kneading target while the kneading target is being transported, and to cause the kneading target to generate heat.

In each of the above-described extruders, a plurality of through holes that are in communication with the outside of the cylinder may be formed in a wall surface of the cylinder, and the plurality of protruding members may be detachably attached to at least some of the plurality of through holes.

In the above-described extruder, the degassing hole may be a through hole out of the plurality of through holes.

In the cylinder of each of the above-described extruders, it is possible that no protruding member out of the plurality of protruding members is provided in an area where the compressor is provided.

In each of the above-described extruders, a pitch of the screw blade may be uniform across an entire length of the screw.

In each of the above-described extruders, the compressor may be variously configured. For example, the compressor may include: a dam part that joins sections of the screw blade that are adjacent in the axial direction; and a plurality of grooves formed along the axial direction in outer circumferential surfaces of the adjacent sections of the screw blade that connect two end portions of the dam part.

In each of the above-described extruders, the adjacent sections of the screw blade, in which the grooves are formed, may have an outer diameter that is larger than an outer diameter of other sections of the screw blade.

In each of the above-described extruders, the screw blade may be provided with a plurality of cutout sections that are lined up along the axial direction, and the protruding members may protrude to the cutout sections such that the protruding members do not interfere with the screw blade.

An extruder according to one aspect of the present invention is capable of removing gas or the like from the kneading target in the same manner as a vent-type extruder, while increasing the amount of ejection.

DESCRIPTION OF EMBODIMENTS

Figure 1:
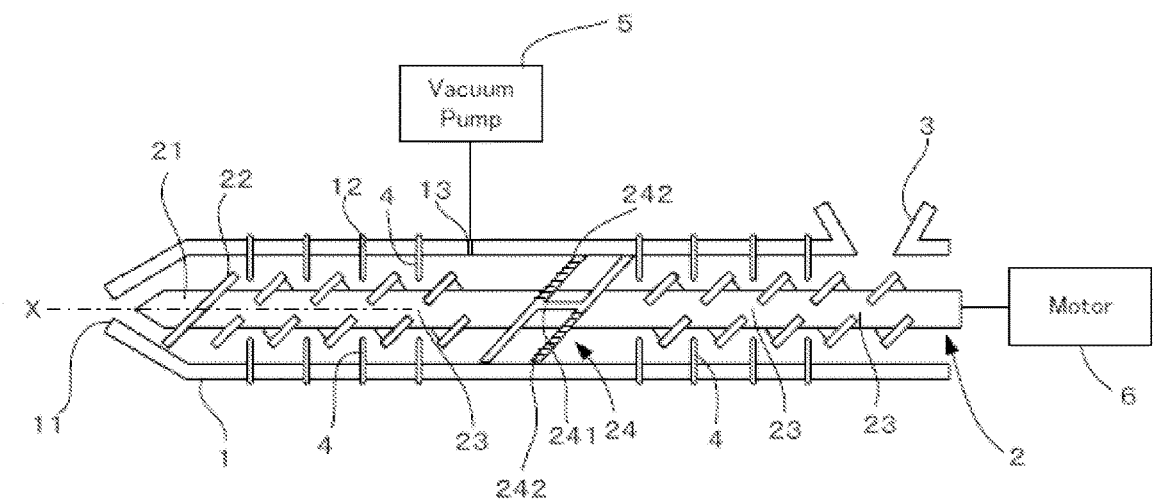
FIG. 1 is a cross-sectional view showing an embodiment of an extruder according to one aspect of the invention.

The following describes an embodiment of an extruder according to one aspect of the present invention with reference to the drawings. FIG. 1 is a cross-sectional view showing an overall configuration of the extruder.

1. Configuration of Extruder

As shown in FIG. 1, the extruder according to the present embodiment is supplied with a rubber composition such as rough rubber, and kneads and extrudes the rubber composition. As shown in FIG. 1, the extruder includes a cylinder 1 having a circular tube shape and a screw 2 that rotates within the cylinder 1. In the cylinder 1, a first end portion, which is located on the left side in FIG. 1, has an ejection port 11 from which rubber that has been kneaded is ejected. A motor 6 that rotates the screw 2 is located on the second end portion 2 side, which is the right side in FIG. 1. The inner diameter of the ejection port 11 is adjusted as needed, and has been adjusted to be small in the present embodiment.

The cylinder 1 is provided with a hopper (supplier) 3, from which a rubber composition is supplied. The hopper 3 is attached to an upper surface of the cylinder 1 on the second end portion side, and is in communication with the inside space of the cylinder 1. Furthermore, the cylinder 1 is provided with a plurality of through holes 12 that are formed at predetermined intervals along the axial direction and at equal intervals in the circumferential direction. Each through hole 12 brings the inside and the outside of the cylinder 1 into communication, and some through holes 12 are provided with a pin (protruding member) 4 that protrudes into the inside space of the cylinder 1. The pins are detachably attached to the through holes 12. Each pin 4 has a circular tube shape, and extends toward an axis X of the cylinder 1, to a position that is in the vicinity of a shaft 21 of the screw 2, as described below.

Next, the screw 2 will be described. The screw 2 includes a shaft 21 that extends along the axis X of the cylinder 1, and a screw blade 22 that is attached to the outer circumferential surface of the shaft 21. The pitch of the screw blade 22 is uniform across the entire length of the screw blade 22. However, the screw blade 22 is not continuous, and is divided into sections at predetermined intervals along the axial direction. In other words, the shaft 21 is provided with gap sections (cutout sections) 23 at predetermined intervals in the axial direction. The screw blade 22 is not formed in the gap sections 23. The through holes 12 in the cylinder 1 are positioned such that the above-described pins 4 respectively extend to the gap sections 23. Note that instead of completely dividing the screw blade 22 into sections, it is also possible to provide the screw blade 22 with cutouts that have a predetermined depth from the outer circumferential surface of the screw blade 22 such that the crew blade 22 does not interfere with the pins 4. It is also possible to change the length of the pins 4 as appropriate.

An intermediate section of the screw 2, i.e., a section between the hopper 3 and the ejection port 11, is provided with a compressor 24 that compresses the rubber composition. The compressor 24 is configured as follows. A section of the screw blade 22 that corresponds to the compressor 24 and spans approximately 360° has a larger outer diameter than another section of the screw blade 22, and is formed so as to come close to the inner wall surface of the cylinder 1. More specifically, a clearance of several millimeters, for example, can be formed so that the gap between the outer circumferential surface of the screw blade 22 and the inner wall surface of the cylinder 1 is sealed by the rubber composition.

The compressor 24 is provided with a dam part 241 that extends in the axial direction and joins adjacent sections of the screw blade 22. The height of the dam part 241 from the shaft 21 is equal to the height of the screw blade 22. Therefore, the rubber composition passing through a gap along the screw blade 22 is held back by the dam part 241 so that the rubber composition is not transported downstream. The outer circumferential surface of the screw blade 22 corresponding to the compressor 24 is provided with a plurality of grooves 242 that span approximately 360° and connect a front end portion and a rear end portion of the dam part 241. The grooves 242 are narrow, extend in the axial direction, and are arranged at predetermined intervals. Therefore, the rubber composition held back by the dam part 241 is transported downstream in the cylinder 1 via the grooves 242.

In the cylinder 1, the pins 4 are not provided in the section of the screw blade 22 that corresponds to the compressor 24. In other words, the through holes 12 in the section are not provided with the pins 4 and the through holes 12 are simply closed. Also, the through hole of the cylinder 1 that is located downstream of the compressor 24 and that is the closest to the compressor 24 is not provided with the pin 4 and a vacuum pump 5 that is located outside the cylinder 1 is connected to this through hole. In other words, this through hole constitutes a degassing hole 13 that discharges moisture, air, and the like contained in the rubber composition. The pins 4 are attached to all of the through holes 12 located downstream of the degassing hole 13 and the through holes 12 located upstream of the compressor 24, and these pins 4 respectively extend to the gap sections 23 of the screw blade 22.

2. Operation of Extruder

Next the operation of the extruder having the above-described configuration will be described. First, the motor 6 is driven to rotate the screw 2. The vacuum pump 5 is also driven. Next, a rubber composition is input from the hopper 3. The rubber composition thus input is transported downstream due to the rotation of the screw 2. During this process, the rubber composition passes through the gap along the screw blade 22, while shear force generated by the pins 4 is applied to the rubber composition. Therefore, the rubber composition is heated due to friction. The rubber composition that has reached the compressor 24 is held back by the dam part 241 and cannot be transported downstream via a gap along the screw blade 22. Therefore, the rubber composition is transported downstream via the grooves 242 formed in the outer circumferential surface of the screw blade 22. The grooves 242 are formed in the outer circumferential surface of the screw blade 22 and span approximately 360°. Therefore, portions of the rubber composition that pass through the grooves 242 are transported downstream while being formed into a circular tube shape.

The surface area of the rubber composition is increased while the rubber composition passes through the narrow grooves 242, and the rubber composition further generates heat. Thus, some components and moisture contained in the rubber composition evaporate. In this way, the surface area is increased so that moisture and the like contained in the rubber composition become likely to be discharged from the surface of the rubber composition. The components thus evaporated are sucked by the vacuum pump 5 located downstream of the compressor 24, and are discharged from the degassing hole 13 to the outside of the cylinder 1. The rubber composition, from which some components, moisture, and the like have been removed, is transported further downstream by the screw 2, and is ejected from the ejection port 11. During this process, the pins 4 located downstream of the compressor 24 also apply heat to the rubber composition.

The rubber composition thus ejected from the extruder is used for manufacturing various kinds of rubber products such as tires.

3. Features

As described above, according to the present embodiment, the plurality of pins 4 are provided on the inner wall surface of the cylinder 1. Therefore, unlike in conventional vent-type extruders, it is unnecessary to partially reduce the pitch of the screw blade in order to apply heat to the rubber composition. Therefore, it is possible to maintain a large pitch of the screw blade 22 while maintaining the features of vent-type extruders, and it is thus possible to increase the amount of ejection.

Also, with the extruder according to the present embodiment, it is possible to use a cylinder that is the same as that used in so-called pin-type extruders. Therefore, there are the following advantages. The cylinder of a typical pin-type extruder has through holes that have been formed in advance and to which pins can be attached. It is possible to detachably attach pins to the trough holes. Therefore, using such a cylinder, it is possible to change the number of pins as appropriate according to the amount of heat to be applied to the rubber composition, for example. In other words, it is possible to attach pins to all of the through holes, or to some of the through holes. When no pin is provided in a through hole, the through hole may be closed with a cap or the like.

Depending on the type of the rubber composition, there is the risk of a portion of the rubber composition being discharged from the degassing hole 13. In such a case, it is possible to change the position of the degassing hole 13 as appropriate. In other words, it is possible to use another through hole as the degassing hole 13.

Furthermore, it is possible to change the position of the compressor 24 according to the type of the rubber composition. For example, a different screw 2, out of a plurality of screws 2 each having the compressor 24 at a different position, may be used depending on the type of the rubber composition. In the cylinder 1, no pin 4 is provided at a position where the compressor 24 is located. In the case mentioned above, it is easy to change the position where the pin 4 is not to be provided, according to the type of the screw 2.

In this way, by using a cylinder in which a plurality of through holes, which are the same as those used in pin-type extruders, have been formed in advance, it is possible to change not only the positions of the pins but also the position of the degassing hole 13 as appropriate.

4. Modifications

An embodiment of the present invention has been described above. However, the present invention is not limited to the above-described embodiment, and various modifications can be made without departing from the spirit of the invention. Note that the following modifications may be combined as appropriate.

4-1

In the above-described embodiment, the pitch of the screw blade 22 is uniform across the entire length of the screw blade 22 in the axial direction. However, it is possible to partially change the pitch depending on the type of the rubber composition for example, insofar as the amount of ejection does not decrease by a large amount.

4-2

In the above-described embodiment, one compressor 24 is provided. However, two or more compressors 24 may be provided. If this is the case, the degassing hole may be located downstream of each compressor 24. With such a configuration, it is possible to remove gas from the rubber composition a plurality of times.

4-3

Figure 2:
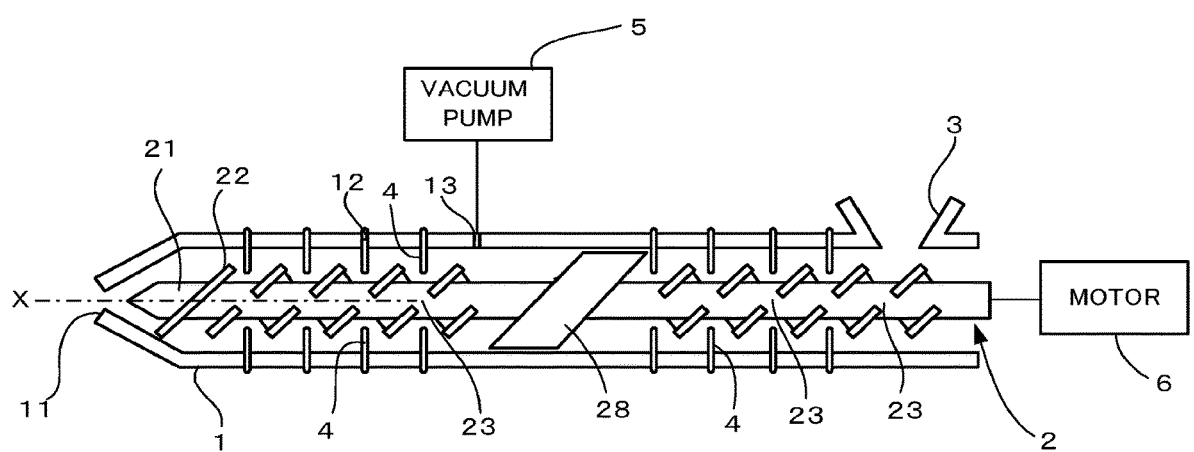
FIG. 2 is a cross-sectional view showing another example of the extruder according to one aspect of the invention.

The configuration of the compressor 24 is not limited to that in the above-described embodiment, and the compressor only needs to be configured to compress the rubber composition and cause the rubber composition to generate heat while the rubber composition passes through the compressor 24. For example, as shown in FIG. 2, a compressor 28 that has a diameter that is greater than the diameter of the shaft 21 may be provided instead of the compressor 24 shown in FIG. 1. This compressor 28 is formed in a circular tube shape that has a predetermined length in the axial direction, and has a small clearance from the inner wall surface of the cylinder 1. The compressor 28 is inclined in the same manner as the screw blade 22. Using such a compressor 28, the rubber composition supplied from the upstream side passes between the compressor 28 and the inner wall surface of the cylinder 1 while being compressed, and moisture and the like contained in the rubber composition evaporate.

4-4

The above-described embodiment shows a case in which a cylinder that is the same as the cylinder of a pin-type extruder is used. However, it is possible that the cylinder is not provided with a through hole, and the cylinder may be configured such that pins are attached directly to the inner wall surface. Also, a degassing hole may be appropriately provided at a position where the degassing hole is required.

4-5

In the above-described embodiment, a description has been given of a case in which a rubber composition is kneaded and extruded. However, the extruder according to one aspect of the present invention is not limited to an extruder for a rubber composition, and is applicable to extruders for various kneading targets such as a resin material.

REFERENCE SIGNS LIST

1 Cylinder
11 Ejection port
12 Through hole
13 Degassing hole
2 Screw
21 Shaft
22 Screw blade
24 Compressor
241 Dam part
242 Groove
28 Compressor
3 Hopper (Supplier)
4 Pin (Protruding member)

The invention claimed is:

1. An extruder comprising:
a hollow cylinder having a first end portion and a second end portion respectively formed at two ends of the cylinder in an axial direction, and an ejection port formed in the first end portion, wherein the cylinder inner diameter is uniform substantially over its entire axial length;
a screw including a shaft configured to rotate within the cylinder, and a first screw blade and a second screw blade provided on an outer circumferential surface of the shaft;
a supplier attached to the second end portion of the cylinder and configured to supply a rubber composition to the cylinder interior; and
a plurality of protruding members protruding from an inner wall surface to the interior of the cylinder,
wherein an intermediate section of the screw in the axial direction is provided with a compressor that is configured to compress the rubber composition while the rubber composition is being transported, and to cause the rubber composition to generate heat,
the first screw blade is disposed at a downstream side from the compressor,
the second screw blade is disposed at an upstream side from the compressor,
the outer diameter of the compressor is larger than that of the first screw blade diameter and the second screw blade diameter,
a plurality of through holes that are in communication with the cylinder exterior are formed in a wall surface of the cylinder including at least one degassing hole located downstream of each compressor,
the plurality of protruding members that protrude into the interior of the cylinder, and optionally one or more caps, are configured to be detachably attached to at least some of the plurality of through holes, as well as configured to close the through holes when attached, and
at least one of the plurality of through holes to which no protruding member or cap is attached functions as one of the degassing holes such that the location of this degassing hole may be changed depending upon the location of the protruding members and optional caps, the location of one of the degassing holes depends upon the type of rubber composition being extruded, in the cylinder, no protruding member out of the plurality of protruding members is provided in an area where the compressor is provided, and one of the degassing holes is formed substantially between the compressor and the first screw blade in the axial direction.

2. The extruder according to claim 1, wherein a pitch of the first and the second screw blade is uniform across the entire length of the screw.

3. The extruder according to claim 1, wherein the compressor includes:

a third screw blade provided on an outer circumferential surface of the shaft, a dam part that joins sections of the third screw blade that are adjacent in the axial direction; and a plurality of grooves formed along the axial direction in outer circumferential surfaces of the adjacent sections of the third screw blade that connect two end portions of the dam part.

4. The extruder according to claim 3, wherein the adjacent sections of the screw blade, in which the grooves are formed, have an outer diameter that is larger than an outer diameter of the first and the second screw blades.

5. The extruder according to claim 1, wherein the first and the second screw blades are provided with a plurality of cutout sections that are lined up along the axial direction, and the protruding members protrude to the cutout sections such that the protruding members do not interfere with the first and the second screw blades.

* * * * *